United States Patent [19]
Price et al.

[11] 3,872,738
[45] Mar. 25, 1975

[54] MACHINE TOOL
[75] Inventors: Ralph E. Price; Robert E. Bricker, both of Waynesboro, Pa.
[73] Assignee: Landis Tool Company, Waynesboro, Pa.
[22] Filed: Sept. 24, 1973
[21] Appl. No.: 399,888

[52] U.S. Cl. ............................ 74/424.8 B, 74/388 R
[51] Int. Cl. ......................... F16h 1/18, F16h 35/06
[58] Field of Search .................... 74/424.8 B, 388 R

[56] References Cited
UNITED STATES PATENTS
3,241,389  3/1966  Brouwer .................... 74/388 R X
3,731,547  5/1973  Fullbrook ................. 74/424.8 B X

*Primary Examiner*—Leonard H. Gerin
*Attorney, Agent, or Firm*—Spencer T. Smith

[57] ABSTRACT

A machine tool comprising a machine element including a feed screw, means for displacing the machine element including a first stepping motor including a drive shaft, a second stepping motor including a drive shaft, means for interconnecting the drive shafts and the feed screw having means for rotating the feed screw in a first direction at a rate directly related to the combined rates of rotation of the drive shafts when the drive shafts rotate in a first direction, and means for rotating the feed screw in the first direction at a rate directly related to the difference between the rates of rotation of the drive shafts when one of the drive shafts is rotated in the first direction at a first rate and the second of the drive shafts is rotated in a second reverse direction at a second rate less than the first rate, means for selectively rotating the first and second stepping motors in the first direction to advance the machine element at a first rate, and means for selectively rotating the first stepping motor in the first direction at the first rate and for selectively rotating the second stepping motor in the second direction at the second rate to advance the machine element at a second slower feed rate.

3 Claims, 4 Drawing Figures

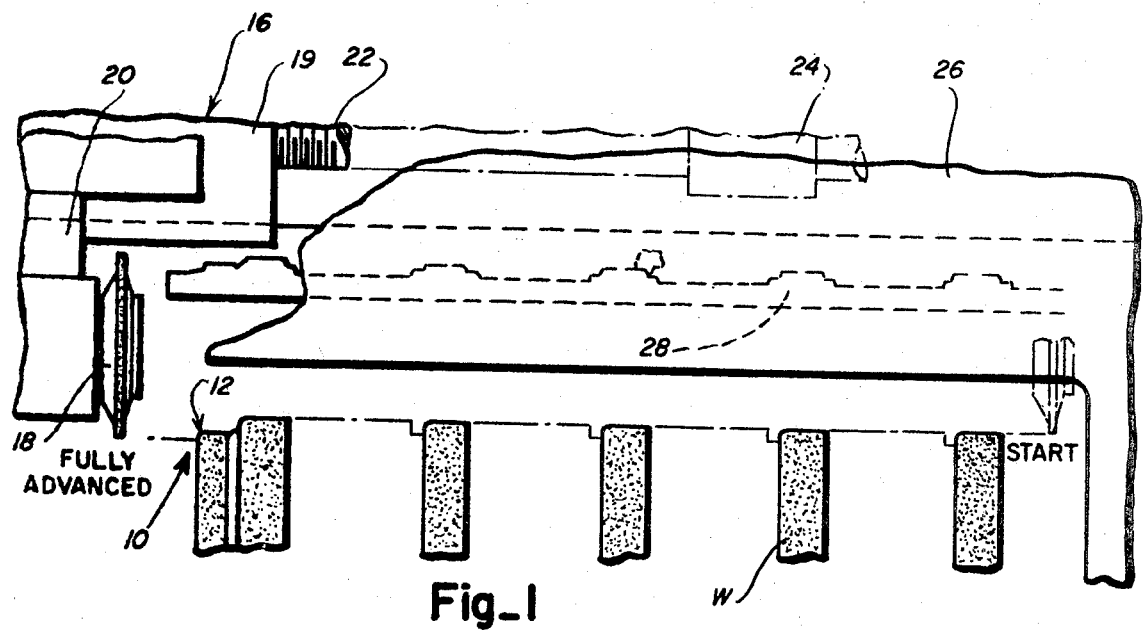
Fig_1
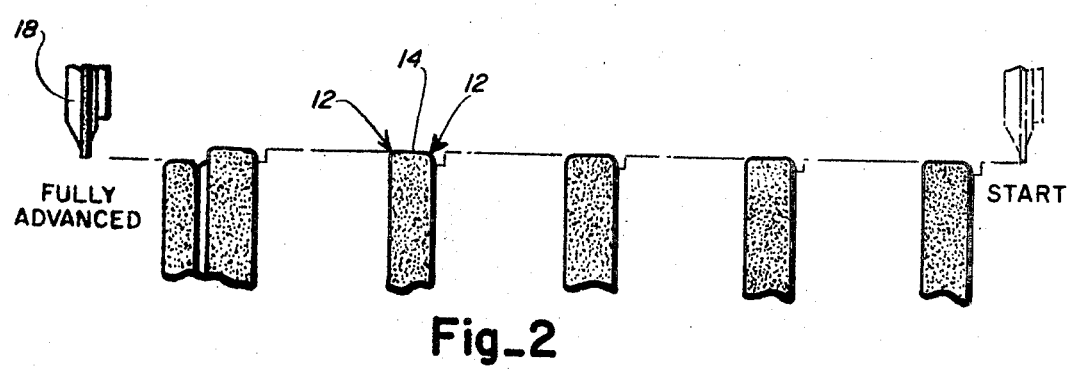
Fig_2

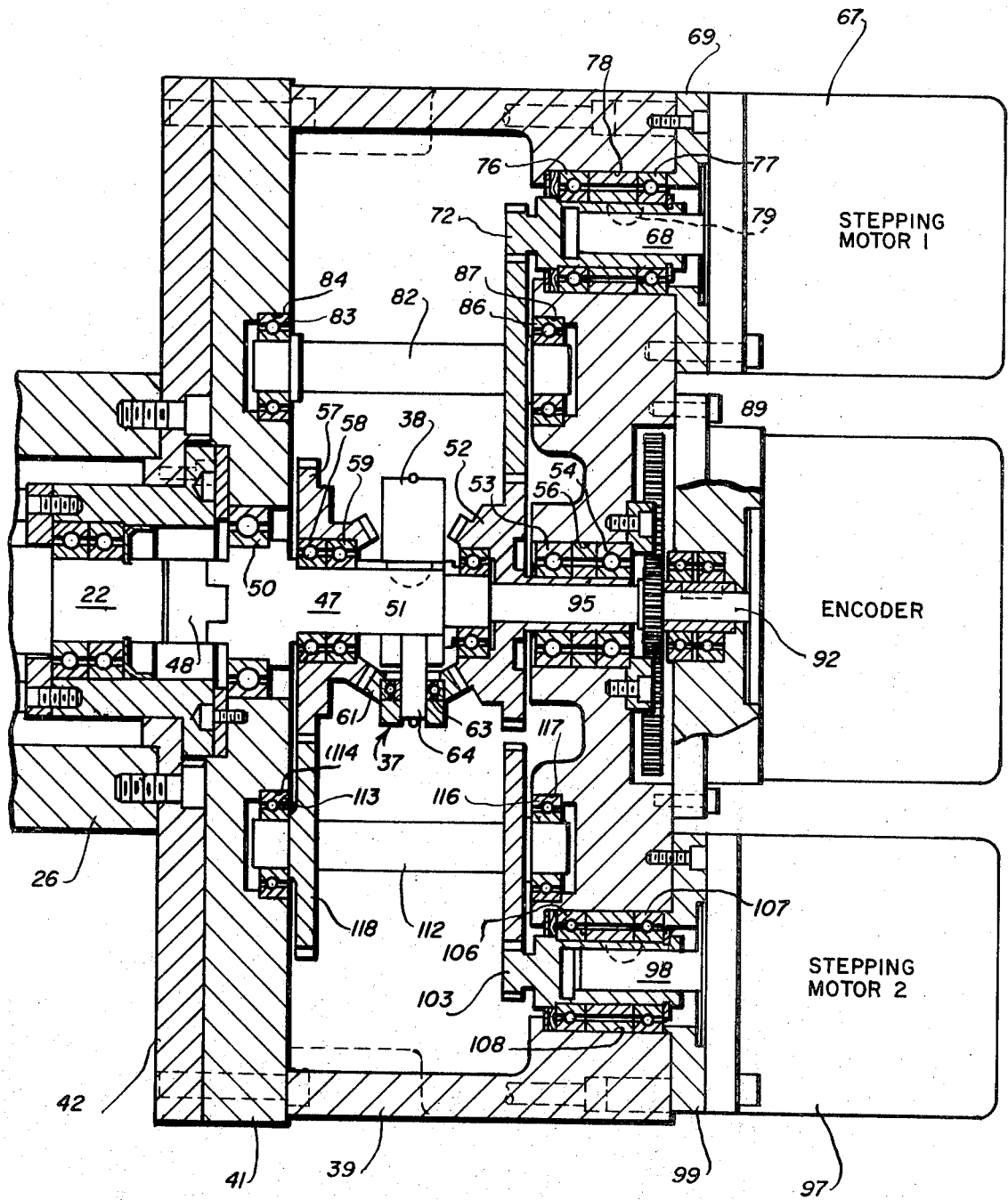
Fig_3

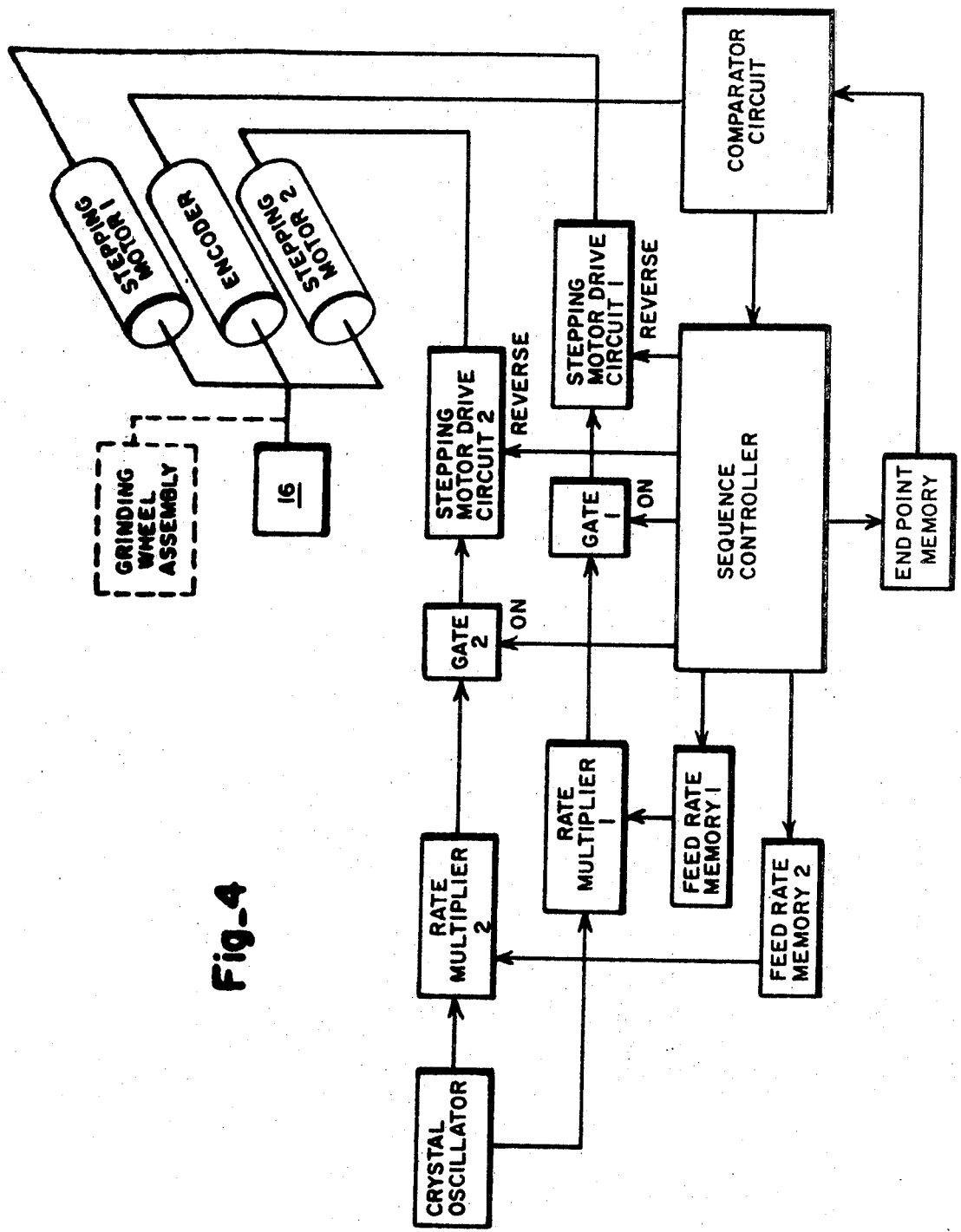
Fig_4

3,872,738

MACHINE TOOL

The present invention relates to grinding machines which include an element which is sequentially advanced through at least two feed zones at substantially different feed rates, and more particularly to grinding wheel dresser assemblies which periodically restore the desired grinding wheel surface configuration.

In multiwheel grinding machines wherein a plurality of grinding wheels are rotatably supported in axially spaced relation on a single grinding wheel spindle, dressing is conventionally effected by a rotary dresser tool which is axially and sequentially traversed to or from the grinding wheels, and across the face and radii thereof at rapid, slow and extremely slow rates respectively.

While traditional hydraulic drive systems are gradually being replaced by electronic drive systems which utilize selectively actuatable stepping motors, such electronic systems are not readily applicable in drive systems such as the one above described where the extreme upper and lower ranges of the stepping motor are to be utilized. In such instances, the power requirements of the stepping motor for driving the dresser tool at a rapid rate cause cogging or vibration of the dresser tool at the extremely low feed rate.

In the past, where a stepping motor was utilized in conjunction with an encoder to precisely control the extremely slow advancement of a machine element such as a grinding wheel which was sequentially advanced at rapid and extremely slow rates, a separate hydraulic system was utilized to produce the required rapid feed.

It is an object of the present invention to provide a stepping motor feed drive for a machine element such as a dressing tool which must be sequentially advanced at rapid and extremely slow rates, which will smoothly feed the machine element at both feed rates.

Other objects and advantages of the present invention will become apparent from the following portion of this specification and from the accompanying drawings which illustrate, in accordance with the mandate of the patent statutes, a presently preferred embodiment incorporating the teachings of the invention.

Referring to the drawings:

FIG. 1 is a schematic plan view of a portion of a grinding machine illustrating the path of the dressing tool thereof as it is displaced from its start to its fully advanced position;

FIG. 2 is a partial view of the grinding machine illustrated in FIG. 1 illustrating the path of the dresser tool from its fully advanced to its fully retracted or start position;

FIG. 3 is a cross sectional plan view of the dresser feed mechanism of the grinding machine illustrated in FIG. 1; and FIG. 4 is a schematic diagram of the electronic control system for the dresser feed mechanism illustrated in FIG. 3.

The cylindrical grinding machine 10 includes a plurality of coaxial grinding wheels W, which are conventionally rotatably supported in spaced relation on a grinding wheel spindle (not shown). Each grinding wheel W may include a pair of contoured portions of radii 12 and a face portion 14 located intermediate the radii 12. The face and radii of each of the grinding wheels are periodically restored to a desired configuration by a dresser 16, which includes a motor driven rotary diamond tool 18.

Axial movement of the slide bar 19 of a cross slide or carriage 20 to which the diamond tool 18 is secured, is effected by rotating a feed screw 22, which is threadedly engaged with a nut assembly 24 mounted on a wheelhead base member 26 and radial movement of the diamond tool is controlled, as the diamond tool is axially displaced, by a conventional selectively configured profile bar 28 and follower arrangement such as is disclosed in detail in U.S. Pat. No. 3,121,423.

When the dressing cycle is started, the diamond tool is traversed a predetermined distance at a first rapid free rate from its fully retracted or start position (FIG. 1) to the right hand edge of the first grinding wheel. The diamond tool is then sequentially advanced across the face of the first grinding wheel at a second or slow feed rate and across the left hand grinding wheel radius of the first grinding wheel at a third extremely slow feed rate, which is slower than the second feed rate. This sequence is sequentially repeated on all of the grinding wheels and the diamond tool is then advanced at the rapid feed rate to a fully advanced position.

The diamond tool 18 is then retracted (FIG. 2) at the rapid feed rate to the left hand edge of the face portion of the last grinding wheel and the face portion and right hand radius of the last grinding wheel are sequentially dressed at the second and third feed rates respectively. This sequence is repeated on all of the grinding wheels and the diamond tool is then retracted at the rapid feed rate to the fully retracted or start position to complete the dressing cycle of the dresser assembly.

The feed screw 22 (FIG. 3) is connected to a rotatable drive shaft 47 of a gear train 37 through a drive coupling 48. The gear train 37, which is housed in a gear case 39 secured to the carriage 20 through a mounting plate 41 and a plate adaptor 42, includes a differential spider 38. The drive shaft 47 is journaled at one end by a bearing 50 carried by the mounting plate 41, and at the other end is journaled in bearing 51 carried by a right hand combination bevel and spur gear 52. The right hand combination bevel and spur gear 52 is rotatably journaled in spaced bearings 53 and 54, which are housed in a bore 56 of the gear case 39 and a left hand combination bevel and spur gear 57 is rotatably journaled in bearings 58 and 59, which are carried by the drive shaft 47. A bevel gear 61 is journaled by a bearing 63, which is carried by a pin 64 secured to the differential spider 38 and engages with the right and left hand combination bevel and spur gears 52 and 57. As can be appreciated, the encoder is directly connected to the feed screw and the position of the feed screw is accordingly identified at all times by the output of the encoder.

Such direct drive is effected by means of an encoder drive gear 95 mounted on the drive shaft 47 which drives the encoder gear 89 of the encoder shaft 92.

A first stepping motor 67 having a motor drive shaft 68 is secured to the gear case 39 through a mounting plate 69. A motor pinion gear 72 is rotatably journaled in spaced bearings 76 and 77, which are housed in a bore 78 in the gear case 39 and the pinion gear 72 is connected to the motor shaft 68 by a key member 79 and engages an idler gear 82. One end of the idler gear 82 is journaled in a bearing 83, which is housed in mounting plate bore 84 and the other end of the idler gear 82 is journaled in a bearing 86, which is housed in gear case bore 87.

The idler gear 82 engages with the right hand combination bevel and spur gear 52 to effect rotation of the ball screw 28 through the differential spider 38, which rotates the drive shaft 47 at a two to one reduction ratio, when only the first stepping motor is being driven.

A second identical stepping motor 97 is secured to the gear case 39 by a second mounting plate 99. The second stepping motor shaft 98 is secured to a motor pinion gear 103, which is rototably journaled in spaced bearings 106 and 107 within a second gear case bore 108. The motor pinion gear 103 engages with a primary compound gear 112 and one end of the primary compound gear 112 is rotatably mounted in a bearing 113, which is housed in mounting plate bore 114. The other end of the primary compound gear 112 is rotatably journaled in a bearing 116, which is housed in gear case bore 117.

The compound gear 112 includes a gear 118, which engages with the right hand combination bevel and spur gear 57. Rotation of both of the stepping motors accordingly results in the rotation of the ball screw 22 through the differential spider 38 at a one to one ratio.

When a dresser cycle start signal (not shown) is received by the sequence controller (FIG. 4), the sequence controller supplies operating signals to the stepping motor drive circuits, to the feed rate memory associated with each stepping motor and to the end point memory to define the parameters of the first dressing step.

Each feed rate memory operates an associated rate multiplier, which receives signals from a crystal oscillator so as to produce a serieis of pulses at the rates determined by the feed rate memories for the first rapid feed step in the dressing cycle.

The end point memory supplies a signal to the comparator circuit indicative of the end point of the first dressing step. A signal indicative of the actual position of the diamond tool 18 as determined by the feed screw 22 is produced by a suitable, associated multiturn encoder and is also supplied to the comparator circuit. The non-equality of the signals compared by the comparator circuit results in a signal being supplied to the sequence controller which operates to supply an ON signal to the gates associated with each of the rate multipliers so as to enable pulses to pass from the rate multipliers to their associated stepping motor drive circuits for driving the stepping motors at the selected rates for the first rapid feed step.

The signals supplied to the stepping motor drive circuits from the sequence controller determine the direction of rotation of the stepping motors. During rapid advance feed both stepping motors are driven in the same forward direction at a rapid rate to additively drive the feed screw.

At the conclusion of rapid feed, the comparator circuit is nulled whereupon the ON signals are removed from the gates thereby terminating the rotation of the stepping motors. The sequence controller again supplies signals to the end point memory to establish a new end point for the next dressing step. A zero feed rate is established for the second stepping motor and a slow feed rate is established for the first stepping motor, which continues to rotate in the same forward direction to effect the desired face dressing of the first grinding wheel.

When the comparator circuit is again nulled, the ON signals to the gates are removed and the sequence controller supplies signals to the end point memory to estabish a new end point and signals are supplied to the stepping motor drive circuits to establish a reverse direction of rotation of the second stepping motor while maintaining the forward direction of rotation of the first stepping motor. The feed rate for the first stepping motor is established at a selected frequency (A) and the feed rate for the second stepping motor is established at a selected frequency (B), which is slightly slower than A, whereby the feed screw will be advanced at an extremely slow rate directly related to A-B, whereby an extremely slow dressing feed rate can be established for radius dressing.

This procedure is sequentially repeated on each of the grinding wheels and the diamond tool is then rapidly advanced to the fully advanced position. The dressing tool is then rapidly retracted by rotaing both stepping motors in the same reverse direction at top speed until the dresser tool is adjacent the face portion of the last grinding wheel. The face portion is dressed by continuing to rotate one of the stepping motors at a slow rate in the reverse direction and the radius portion of the last grinding wheel is dressed by rotating one of the stepping motors in the opposite direction at the selected frequency A and by rotating the second stepping motor in the forward direction at the selected frequency B. This sequence is repeated on each of the grinding wheels and the dresser tool is then rapidly retracted by rotating both stepping motors in the same direction at top speed until the dresser tool has been displaced to the fully retracted or start position. The dressing cycle is then finished.

While the invention has been disclosed with reference to a dresser assembly it has equal applicability to feed systems for other machine tool elements, such as a grinding wheel feed system, wherein the machine tool element is sequentially advanced at rapid and extremely slow rates. The details of such a system are disclosed in detail in U.S. Pat. No. 3,716,949.

What is claimed is:

1. A machine tool comprising
  a machine element including a feed screw,
  means for displacing said machine element including
    first stepping motor means including a drive shaft,
    second stepping motor means including a drive shaft, means for interconnecting said drive shafts and said feed screw having
    means for rotating said feed screw in a first direction at a rate directly related to the combined rates of rotation of said drive shafts when said drive shafts rotate in a first direction, and
    means for rotating said feed screw in said first direction at a rate directly related to the difference between the rates of rotation of said drive shafts when one of said drive shafts is rotated in said first direction at a first rate and the second of said drive shafts is rotated in a second reverse direction at a second rate less than said first rate,
  means for selectively and conjointly rotating said first and second stepping motor means in said first direction to advance said machine element at a first speed, and
  means for selectively rotating said first stepping motor means in said first direction at said first rate and for selectively rotating said second stepping motor means in said second direction at said second rate, said first and second rates being selected so that said machine element will be advanced at a second slower speed.

2. A machine tool according to claim 1, wherein said interconnecting means further includes
means for rotating said feed screw in a second direction at a rate directly related to the combined rates of rotation of said drive shafts when said drive shafts rotate in said second direction, and
means for rotating said feed screw in said second direction at a rate directly related to the difference between the rates of rotation of said drive shafts when one of said drive shafts is rotated in said second direction at a third rate and the other one of said drive shafts is rotated in said first direction at a fourth rate less than said third rate, further comprising
means for selectively and conjointly rotating said first and second stepping motor means in said second direction to retract said machine element at a third speed, and
means for selectively rotating said one stepping motor means in said second direction at said third rate and for selectively rotating said other stepping motor means in said first direction at said fourth rate, said third and fourth rates being selected so that said machine element will be retracted at a fourth speed which is less than said third speed.

3. A machine tool according to claim 2 wherein said first speed equals said third speed and said second speed equals said fourth speed.

* * * * *